(12) United States Patent
Bresnahan, Sr. et al.

(10) Patent No.: US 10,246,113 B2
(45) Date of Patent: Apr. 2, 2019

(54) WHEEL BARROW

(71) Applicants: William Michael Bresnahan, Sr., Medical Lake, WA (US); Kirby Killman, Cheney, WA (US)

(72) Inventors: William Michael Bresnahan, Sr., Medical Lake, WA (US); Kirby Killman, Cheney, WA (US)

( * ) Notice: Subject to any disclaimer, the term of this patent is extended or adjusted under 35 U.S.C. 154(b) by 0 days.

(21) Appl. No.: 15/961,652

(22) Filed: Apr. 24, 2018

(65) Prior Publication Data

US 2019/0071108 A1    Mar. 7, 2019

Related U.S. Application Data

(60) Provisional application No. 62/553,677, filed on Sep. 1, 2017.

(51) Int. Cl.
| | |
|---|---|
| *B62B 1/00* | (2006.01) |
| *B62B 1/18* | (2006.01) |
| *B62B 3/00* | (2006.01) |
| *B62B 5/00* | (2006.01) |

(52) U.S. Cl.
CPC ............ *B62B 1/186* (2013.01); *B62B 3/001* (2013.01); *B62B 5/002* (2013.01); *B62B 2301/04* (2013.01)

(58) Field of Classification Search
CPC ........... B62B 1/18; B62B 1/186; B62B 3/001; B62B 5/002; B62B 2301/04
See application file for complete search history.

(56) References Cited

U.S. PATENT DOCUMENTS

| | | | | |
|---|---|---|---|---|
| 3,572,455 | A * | 3/1971 | Brueske ................... | B60K 1/00 180/214 |
| 3,996,950 | A * | 12/1976 | Mier ........................ | A45B 3/00 135/66 |
| 4,190,260 | A * | 2/1980 | Pearce ..................... | B62B 1/18 280/47.31 |
| 4,854,601 | A * | 8/1989 | Herndon .................. | B62B 1/18 280/47.31 |
| 7,032,718 | B1 * | 4/2006 | Lessard ................... | B62B 5/04 188/19 |
| 9,296,404 | B1 * | 3/2016 | Bell ......................... | B62B 1/12 |
| 2005/0258007 | A1 * | 11/2005 | Albert ..................... | B62B 1/18 188/2 D |
| 2007/0039986 | A1 * | 2/2007 | Tomasi ................... | B25H 3/04 224/401 |
| 2007/0261905 | A1 * | 11/2007 | Lin ......................... | B62B 1/18 180/213 |

(Continued)

*Primary Examiner* — Brian L Swenson (57) ABSTRACT

A wheel barrow that includes a three-wheel design and a secondary handle so that almost any single user, such as a disabled military veteran, can utilize the wheel barrow compared to traditional wheel barrows. The wheel barrow includes an A-frame, a first front wheel, a second front wheel, a rear wheel, a barrow receptacle, a clevis, and a handle bar. The A-frame is the main structural body of the wheel barrow. The first front wheel and the second front wheel provide a primary conveyance means for the wheel barrow. The rear wheel provides a secondary conveyance means for the wheel barrow and allows the wheel barrow to stand upright without the aid of the user. The barrow receptacle provides a storage means to carry material. The clevis allows the user to change directions when utilizing the wheel barrow. The handle bar provides an efficient leverage means.

18 Claims, 5 Drawing Sheets

(56) References Cited

U.S. PATENT DOCUMENTS

| | | | |
|---|---|---|---|
| 2008/0150246 A1* | 6/2008 | Lox | B62B 1/18 |
| | | | 280/47.34 |
| 2010/0019472 A1* | 1/2010 | DiLorenzo, Sr. | B62B 3/001 |
| | | | 280/653 |
| 2015/0321685 A1* | 11/2015 | Smoot | B62B 1/24 |
| | | | 280/47.26 |
| 2016/0332649 A1* | 11/2016 | Buttimer | B62B 3/08 |

* cited by examiner

WHEEL BARROW

The current application claims a priority to the U.S. Provisional Patent application Ser. No. 62/553,677 filed on Sep. 1, 2017.

FIELD OF THE INVENTION

The present invention relates generally to wheel barrows. More specifically, the present invention is a wheel barrow which includes a three-wheel design and a handle bar so that almost any individual, such as a disabled military veteran, can utilize the present invention.

BACKGROUND OF THE INVENTION

A wheel barrow is a manually-propelled vehicle which is designed to be pushed by a single user. The typical wheelbarrow includes either one wheel or two wheels as a conveyance means and two handles at the rear which allows the user to push or pull the wheelbarrow across a surface. The typical design of a wheel barrow distributes the weight of the load between the wheel(s) and the user, which may be difficult. In more detail, A disabled military veteran may have difficultly carrying the load when utilizing a wheel barrow.

It is therefore an objective of the present invention to provide a wheel barrow which includes a three-wheel design and a secondary handle so that almost any individual, such as a disabled military veteran, can utilize the present invention. The three-wheel design of the present invention provides more stability and distributes the weight of the load mainly to the wheels rather than between the wheels and the user. The secondary handle provides a more efficient means of leverage to push or pull the present invention across a surface.

DETAIL DESCRIPTIONS OF THE INVENTION

All illustrations of the drawings are for the purpose of describing selected versions of the present invention and are not intended to limit the scope of the present invention.

In reference to FIGS. 1 through 5, the present invention is a wheel barrow that has a three-wheel design and a secondary handle so that almost any individual, such as a disabled military veteran, can easily utilize the present invention compared to traditional wheel barrows. The present invention comprises an A-frame 1, a first front wheel 4, a second front wheel 5, a rear wheel 6, a clevis 7, a barrow receptacle 8, and a handle bar 9. The A-frame 1 functions as the main structural body within the present invention so that the first front wheel 4, the second front wheel 5, the clevis 7, the barrow receptacle 8, and the handle bar 9 can be positioned and connected onto the main structural body. The A-frame 1 is extended longer, approximately 2-3 inches more, than conventional frames of wheel barrows in order for the user to effectively dig into the ground to scoop material with the present invention. The first front wheel 4 and the second front wheel 5 provide a conveyance means which allows the user to easily push or pull the present invention across any surface. The first front wheel 4 and the second front wheel 5 are preferably pneumatic wheels which include spokes. The rear wheel 6 provides an additional conveyance means and improves stability and maneuverability of the present invention. The rear wheel 6 is preferably a solid rubber wheel. The clevis 7 allows the rear wheel 6 to be mounted to the A-frame 1. The barrow receptacle 8 provides a storage means which allows the user to carry materials when utilizing the present invention. The barrow receptacle 8 may be composed of any material such as, but not limited to, a durable poly product which makes the barrow receptacle 8 difficult to break or crack. The handle bar 9 provides a leverage means which allows the user to easily push or pull the present invention. The handle bar 9 may be composed of any material such as, but not limited to, aluminum.

Figure 1:
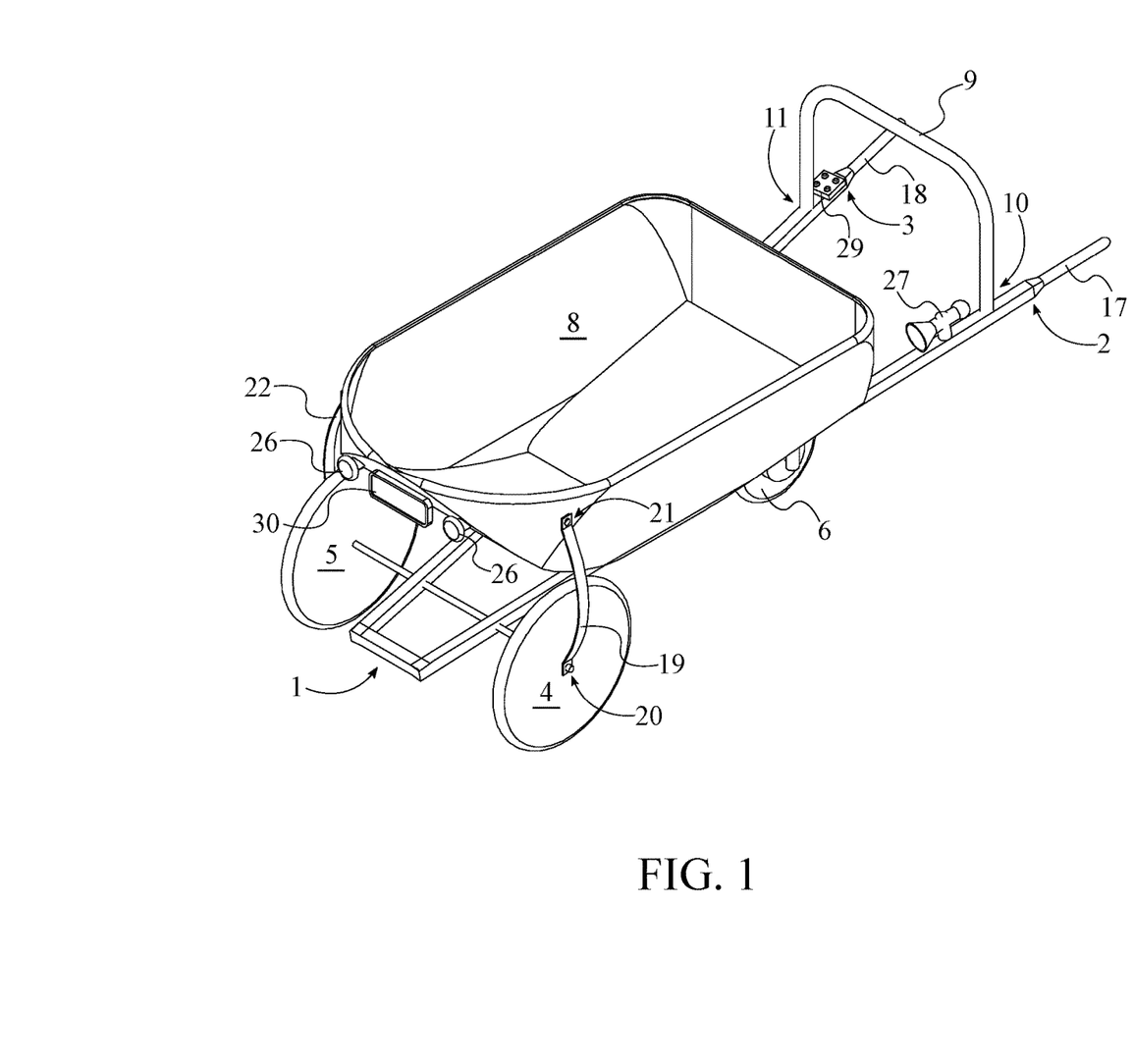
FIG. 1 is a front perspective view of the present invention.
Figure 3:
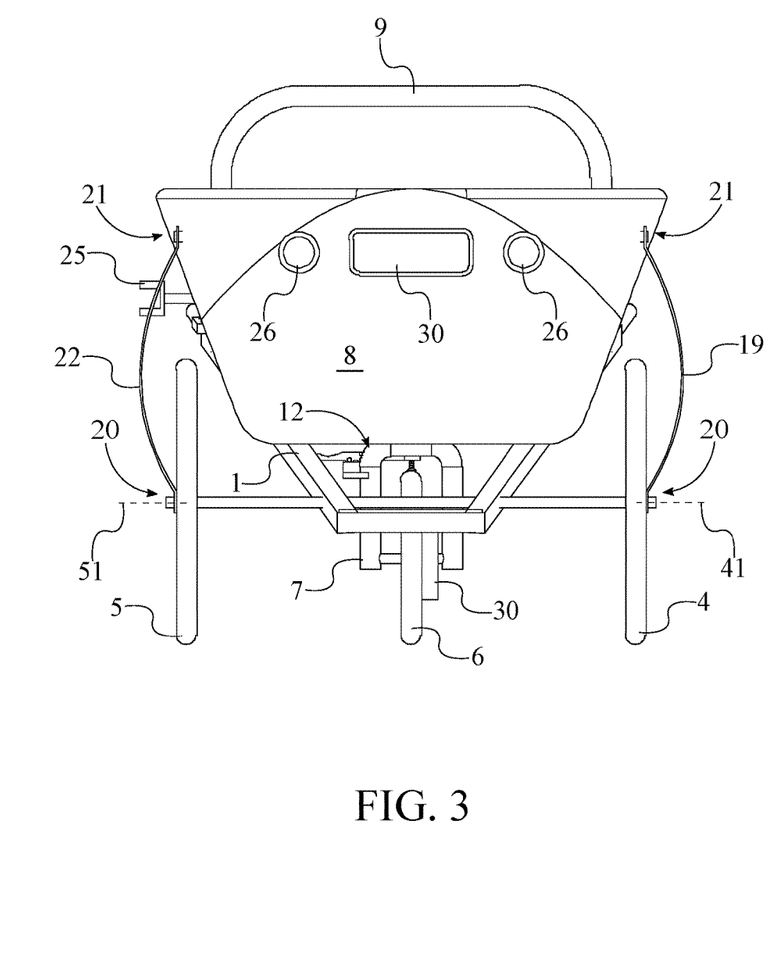
FIG. 3 is a front view of the present invention.

The general configuration of the components provides a specially designed wheel barrow that can be utilized by almost any individual such as a disabled military veteran. As seen in FIGS. 1 and 3, the first front wheel 4 and the second front wheel 5 are positioned opposite to each other across the A-frame 1 which allows the conveyance means to be symmetrical. The first front wheel 4 and the second front wheel 5 are rotatably mounted to the A-frame 1 which allows the present invention to be translated across any surface. The barrow receptacle 8 is positioned between the first front wheel 4 and the second front wheel 5 in order to maintain a proper center of gravity. The barrow receptacle 8 is mounted adjacent to the A-frame 1 in order to maintain the barrow receptacle 8 in place when the user places items within the barrow receptacle 8. The rear wheel 6 is positioned offset from the first front wheel 4 and the second front wheel 5 along on the A-frame 1 in order to properly stabilize the present invention when stationary. The clevis 7 is swivelably mounted onto the A-frame 1. The rear wheel 6 is rotatably mounted into the clevis 7. This arrangement allows the user to change the direction of movement of the present invention and allows the rear wheel 6 to be translated across any surface. The handle bar 9 is positioned offset to the barrow receptacle 8. The handle bar 9 is connected onto the A-frame 1, opposite to the rear wheel 6. The arrangement of the handle bar 9 allows the user to efficiently push or pull the present invention across any surface.

In the preferred embodiment of the present invention, the handle bar 9 is a U-shaped bar. The handle bar 9 comprises a first bar end 10 and a second bar end 11. The first bar end 10 and the second bar end 11 are connected onto the A-frame 1. The first bar end 10 and the second bar end 11 are positioned across the A-frame 1. This arrangement allows the handle bar 9 to be stable when pulling or pushing the present invention across any surface.

Figure 4:
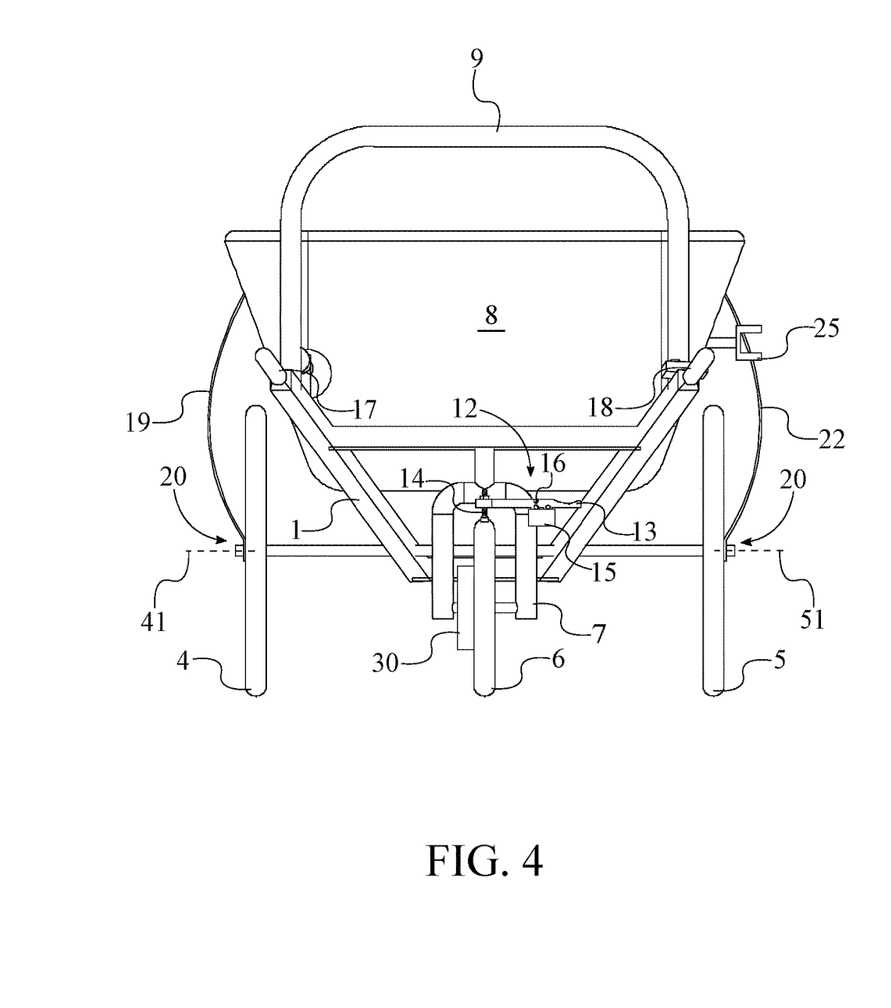
FIG. 4 is a rear view of the present invention.
Figure 5:
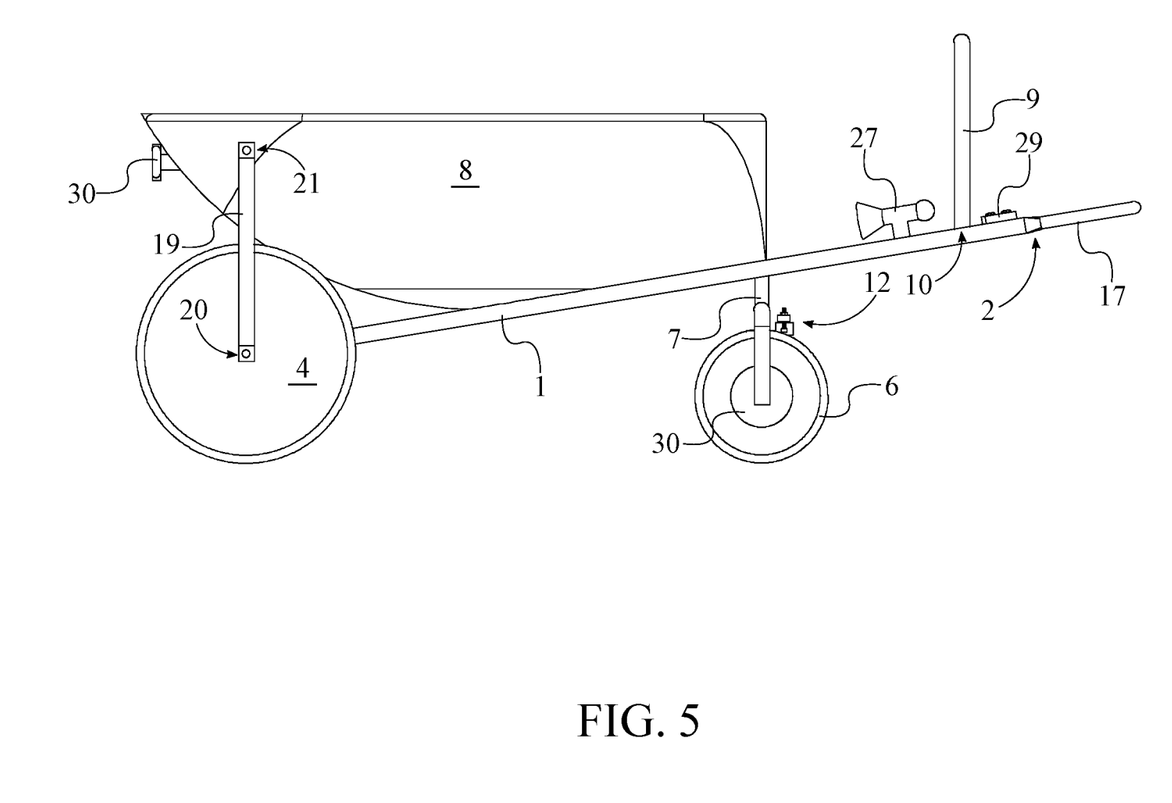
FIG. 5 is a side view of the present invention.

As seen in FIGS. 3 and 4, the first front wheel 4 comprises a first rotation axis 41 and the second front wheel 5 comprises a second rotation axis 51. The first rotation axis 41 is the axis which the first front wheel 4 rotates about when the present invention is translated across any surface. Similarly, the second rotation axis 51 is the axis which the second front wheel 5 rotates about when the present invention is translated across any surface. The first rotation axis 41 of the first front wheel 4 is positioned collinear to the second rotation axis 51 of the second front wheel 5. This arrangement allows the first front wheel 4 and the second front wheel 5 to be translated across the same plane of any surface which further allows the present invention to be smoothly and efficiently translated across any surface.

As seen in FIG. 3, the present invention may further comprise a hand brake assembly 12. The hand brake assembly 12 provides a means to prevent the present invention from being accidently translated across any surface. The hand brake assembly 12 is mounted adjacent to the clevis 7. The handle brake assembly is operatively coupled to the rear wheel 6, wherein the hand brake assembly 12 is used to prevent rotation of the rear wheel 6. The arrangement of the hand brake assembly 12 allows the user easily to prevent the present invention from moving across a surface.

As seen in FIG. 4, the hand brake assembly 12 comprises a lever 13, a stopper 14, a base 15, and a locking mechanism 16. The lever 13 provides a control means to actuate the rotation prevention function of the hand brake assembly 12. The stopper 14 provides a physical structure which prevents the rear wheel 6 from being rotated. The base 15 houses the locking mechanism 16, and the connections of the lever 13 and stopper 14. The base 15 is laterally mounted to the clevis 7. The stopper 14 is hingedly connected to the base 15. The lever 13 is hingedly connected to the base 15. The stopper 14 is operatively coupled to the lever 13, wherein the lever 13 is used to press the stopper 14 against the rear wheel 6. The locking mechanism 16 is operatively integrated within the hinged connection between the base 15 and the lever 13, wherein the locking mechanism 16 is used to hold the lever 13 in place. This arrangement allows the user to control the lever 13 which causes the stopper 14 to make contact with the rear wheel 6 to prevent rotation of the rear wheel 6.

As seen in FIG. 1, the present invention may further comprise a first bumper 17 and a second bumper 18. The first bumper 17 and the second bumper 18 prevent the present invention and user from being damaged or harmed when the present invention is translated across any surface. The first bumper 17 and the second bumper 18 may optionally be used as a secondary leverage means if the user finds this more efficient and comfortable compared to the handle bar 9. The A-frame 1 comprises a first free end 2 and a second free end 3. The first free end 2 and the second free end 3 are positioned offset from each other. The handle bar 9 is positioned offset from the first free end 2 and the second free end 3. The first bumper 17 is connected adjacent to the first free end 2. The second bumper 18 is connected adjacent to the second free end 3. This arrangement provides enough clearance between the user and any object or surface which the present invention may be pushed against.

As seen in FIGS. 3 and 4, the present invention may further comprise a first wheel brace 19 and a second wheel brace 22. The first wheel brace 19 and the second wheel brace 22 define the height of the present invention. The first wheel brace 19 and the second wheel brace 22 each comprise a proximal end 20 and a distal end 21. The first front wheel 4 and the second front wheel 5 are positioned in between the first wheel brace 19 and the second wheel brace 22. The proximal end 20 of the first wheel brace 19 is axially connected to the first front wheel 4. The distal end 21 of the first wheel brace 19 is externally connected to the barrow receptacle 8. This arrangement provides stability between the first front wheel 4 and the barrow receptacle 8. Similarly, the proximal end 20 of the second wheel brace 22 is axially connected to the second front wheel 5. The distal end 21 of the second wheel brace 22 is externally connected to the barrow receptacle 8. This arrangement provides stability between the second front wheel 5 and the barrow receptacle 8.

Figure 2:
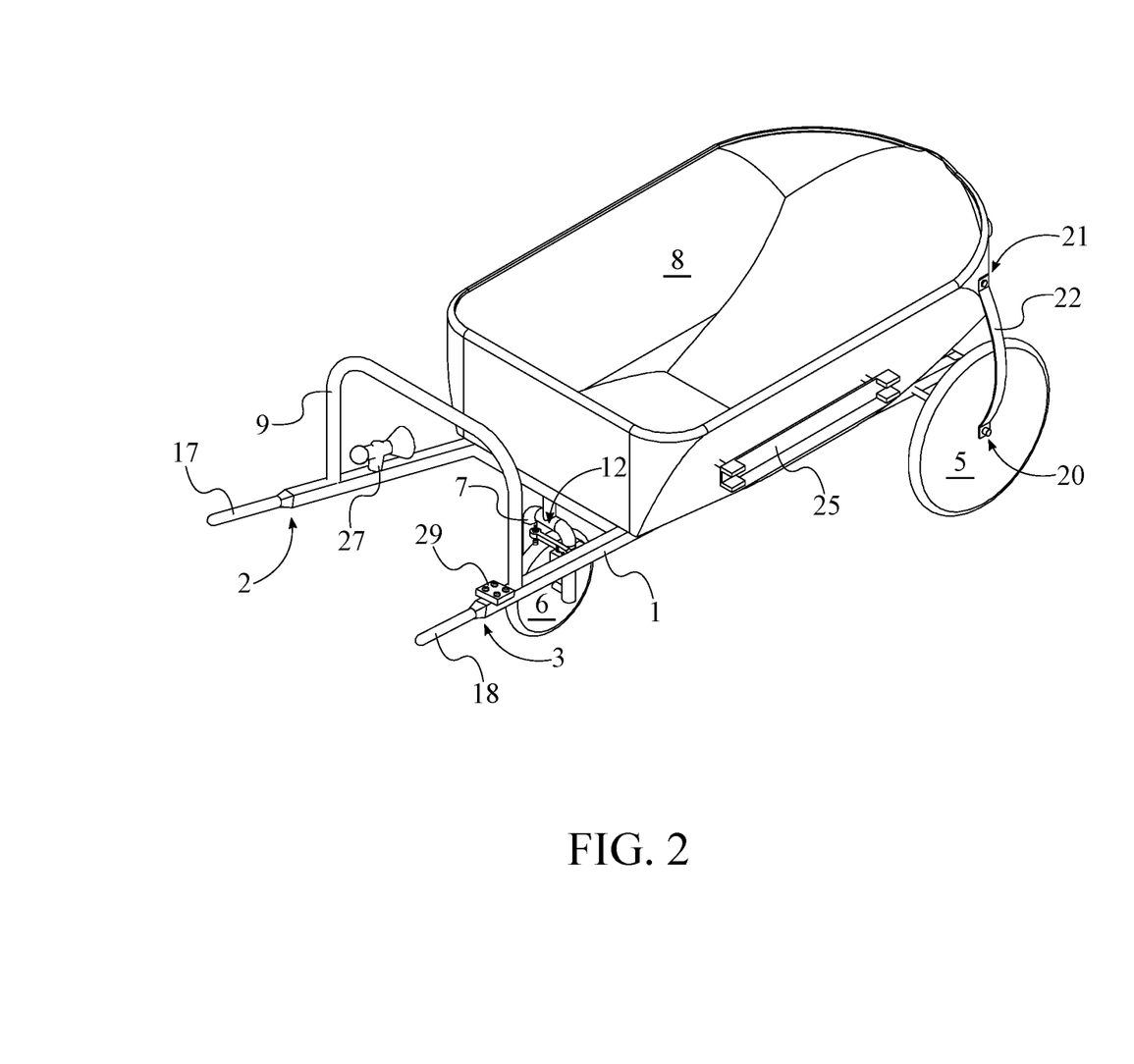
FIG. 2 is a rear perspective view of the present invention.

As seen in FIG. 2, the present invention may further comprise at least one tool bracket 25. The at least one tool bracket 25 allows the user to attach tools such as, but not limited to, rakes or shovels. The at least one tool bracket 25 is externally mounted to the barrow receptacle 8. This arrangement allows the user to attach a tool without obstructing what is placed inside the barrow receptacle 8.

As seen in FIG. 3, the present invention may further comprise a plurality of reflectors 26. The plurality of reflectors 26 allows the present invention to be visible when light is shined upon the present invention. The plurality of reflectors 26 is distributed around the barrow receptacle 8. The plurality of reflectors 26 is externally mounted to the barrow receptacle 8. This arrangement allows the present invention allows the present invention to be visible at multiple angles when light is shined up on the present invention.

As seen in FIG. 1, the present invention may further comprise a sound-generating device 27. The sound-generating device 27 allows the user to alert bystanders or animals which may come across the path of the present invention. The sound-generating device 27 may be a whistle or a horn. The sound-generating device 27 is positioned offset from the handle bar 9. The sound-generating device 27 is mounted adjacent to the A-frame 1. This arrangement allows the user to easily actuate the sound-generating device 27 while pushing or pulling the present invention across a surface.

As seen in FIGS. 1 and 4 and in an alternative embodiment of the present invention, the present invention may further comprise a motor 28 and a control unit 29. The motor 28 allows the present invention to be translated across any surface without any manual work from the user. The control unit 29 provides a control means to actuate the motor 28. The motor 28 is laterally mounted to the clevis 7. The control unit 29 is mounted onto the A-frame 1. The motor 28 is operatively coupled to the rear wheel 6, where in the motor 28 is used to drive rotation of the rear wheel 6. The control unit 29 is electrically connected to the motor 28. The control unit 29 and the motor 28 may be powered by an external or internal power source such as, but not limited to, a battery.

As seen in FIGS. 1 and 3, the present invention may further comprise at least one headlight 30. The at least one headlight 30 allows the user to visibly see while utilizing the present invention in dark conditions. The at least one headlight 30 is externally connected to the barrow receptacle 8. The control unit 29 that controls the motor 28, is electrically connected to the at least one headlight 30. This arrangement provides an illumination means for the user during night time when utilizing the present invention. The control unit 29 and the at least one headlight 30 may be powered by an external or internal power source such as, but not limited to, a battery.

Although the invention has been explained in relation to its preferred embodiment, it is to be understood that many other possible modifications and variations can be made without departing from the spirit and scope of the invention as hereinafter claimed.

What is claimed is:

1. A wheel barrow comprises:
an A-frame;
a first front wheel;
a second front wheel;
a rear wheel;
a clevis;
a barrow receptacle;
a handle bar;
the first front wheel and the second front wheel being positioned opposite to each other across the A-frame;
the first front wheel and the second front wheel being rotatably mounted to the A-frame;
the barrow receptacle being positioned between the first front wheel and the second front wheel;

the barrow receptacle being mounted adjacent to the A-frame;
the rear wheel being positioned offset from the first front wheel and the second front wheel along on the A-frame;
the clevis being swivelably mounted onto the A-frame;
the rear wheel being rotatably mounted into the clevis;
the handle bar being positioned offset to the barrow receptacle;
the handle bar being connected onto the A-frame, opposite to the rear wheel;
a first wheel brace;
a second wheel brace;
the first wheel brace and the second wheel brace each comprise a proximal end and a distal end;
the first front wheel and the second front wheel being positioned in between the first wheel brace and the second wheel brace;
the proximal end of the first wheel brace being axially connected to the first front wheel;
the distal end of the first wheel brace being externally connected to the barrow receptacle;
the proximal end of the second wheel brace being axially connected to the second front wheel; and
the distal end of the second wheel brace being externally connected to the barrow receptacle.

2. The wheel barrow as claimed in claim 1 comprises:
the handle bar being a U-shaped bar;
the handle bar comprises a first bar end and a second bar end;
the first bar end and the second bar end being connected onto the A-frame; and
the first bar end and the second bar end being positioned across the A-frame.

3. The wheel barrow as claimed in claim 1 comprises:
a first rotation axis of the first front wheel being positioned collinear to a second rotation axis of the second front wheel.

4. The wheel barrow as claimed in claim 1 comprises:
a hand brake assembly;
the hand brake assembly being mounted adjacent to the clevis; and
the hand brake assembly being operatively coupled to the rear wheel, wherein the hand brake assembly is used to prevent rotation of the rear wheel.

5. The wheel barrow as claimed in claim 4 comprises;
the hand brake assembly comprises a lever, a stopper, a base, and a locking mechanism;
the base being laterally mounted to the clevis;
the stopper being hingedly connected to the base;
the lever being hingedly connected to the base;
the stopper being operatively coupled to the lever, wherein the lever is used to press the stopper against the rear wheel; and
the locking mechanism being operatively integrated within the hinged connection between the base and the lever, wherein the locking mechanism is used to hold the lever in place.

6. The wheel barrow as claimed in claim 1 comprises:
a first bumper;
a second bumper;
the A-frame comprises a first free end and a second free end;
the first free end and the second free end being positioned offset from each other;
the handle bar being positioned offset from the first free end and the second free end;
the first bumper being connected adjacent to the first free end; and
the second bumper being connected adjacent to the second free end.

7. The wheel barrow as claimed in claim 1 comprises:
at least one tool bracket; and
the at least one tool bracket being externally mounted to the barrow receptacle.

8. The wheel barrow as claimed in claim 1 comprises:
a plurality of reflectors;
the plurality of reflectors being distributed around the barrow receptacle; and
the plurality of reflectors being externally mounted to the barrow receptacle.

9. The wheel barrow as claimed in claim 1 comprises:
a sound-generating device;
the sound-generating device being positioned offset from the handle bar; and
the sound-generating device being mounted adjacent to the A-frame.

10. The wheel barrow as claimed in claim 1 comprises:
a motor;
a control unit;
the motor being laterally mounted to the clevis;
the control unit being mounted onto the A-frame;
the motor being operatively coupled to the rear wheel, wherein the motor is used to drive rotation of the rear wheel; and
the control unit being electrically connected to the motor.

11. The wheel barrow as claimed in claim 1 comprises:
at least one headlight;
a control unit;
the at least one headlight being externally mounted to the barrow receptacle;
the control unit being mounted onto the A-frame; and
the control unit being electrically connected to the at least one headlight.

12. The wheel barrow comprises:
an A-frame;
a first front wheel;
a second front wheel;
a rear wheel;
a clevis;
a barrow receptacle;
a handle bar;
a hand brake assembly;
the first front wheel and the second front wheel being positioned opposite to each other across the A-frame;
the first front wheel and the second front wheel being rotatably mounted to the A-frame;
the barrow receptacle being positioned between the first front wheel and the second front wheel;
the barrow receptacle being mounted adjacent to the A-frame;
the rear wheel being positioned offset from the first front wheel and the second front wheel along on the A-frame;
the clevis being swivelably mounted onto the A-frame;
the rear wheel being rotatably mounted into the clevis;
the handle bar being positioned offset to the barrow receptacle;
the handle bar being connected onto the A-frame, opposite to the rear wheel;
the hand brake assembly being mounted adjacent to the clevis;

the hand brake assembly being operatively coupled to the rear wheel, wherein the hand brake assembly is used to prevent rotation of the rear wheel;
a first rotation axis of the first front wheel being positioned collinear to a second rotation axis of the second front wheel;
a first wheel brace;
a second wheel brace;
the first wheel brace and the second wheel brace each comprise a proximal end and a distal end;
the first front wheel and the second front wheel being positioned in between the first wheel brace and the second wheel brace;
the proximal end of the first wheel brace being axially connected to the first front wheel;
the distal end of the first wheel brace being externally connected to the barrow receptacle;
the proximal end of the second wheel brace being axially connected to the second front wheel; and
the distal end of the second wheel brace being externally connected to the barrow receptacle.

13. The wheel barrow as claimed in claim 12 comprises;
the hand brake assembly comprises a lever, a stopper, a base, and a locking mechanism;
the base being laterally mounted to the clevis;
the stopper being hingedly connected to the base;
the lever being hingedly connected to the base;
the stopper being operatively coupled to the lever, wherein the lever is used to press the stopper against the rear wheel; and
the locking mechanism being operatively integrated within the hinged connection between the base and the lever, wherein the locking mechanism is used to hold the lever in place.

14. The wheel barrow as claimed in claim 12 comprises:
a first bumper;
a second bumper;
the A-frame comprises a first free end and a second free end;
the first free end and the second free end being positioned offset from each other;
the handle bar being positioned offset from the first free end and the second free end;
the first bumper being connected adjacent to the first free end; and
the second bumper being connected adjacent to the second free end.

15. The wheel barrow as claimed in claim 12 comprises:
at least one tool bracket; and
the at least one tool bracket being externally mounted to the barrow receptacle.

16. The wheel barrow as claimed in claim 12 comprises:
a plurality of reflectors;
the plurality of reflectors being distributed around the barrow receptacle; and
the plurality of reflectors being externally mounted to the barrow receptacle.

17. The wheel barrow as claimed in claim 12 comprises:
a sound-generating device;
the sound-generating device being positioned offset from the handle bar; and
the sound-generating device being mounted adjacent to the A-frame.

18. The wheel barrow as claimed in claim 12 comprises:
a motor;
a control unit;
at least one headlight;
the motor being laterally mounted to the clevis;
the control unit being mounted onto the A-frame;
the motor being operatively coupled to the rear wheel, wherein the motor is used to drive rotation of the rear wheel;
the control unit being electrically connected to the motor;
the at least one headlight being externally mounted to the barrow receptacle;
the control unit being mounted onto the A-frame; and
the control unit being electrically connected to the at least one headlight.

* * * * *